United States Patent [19]

Liu

[11] Patent Number: 5,106,705

[45] Date of Patent: Apr. 21, 1992

[54] VINYL ETHER SILOXANES AS PROTECTIVE COATINGS AND SOIL-RELEASE SURFACINGS

[75] Inventor: Kou-Chang Liu, Wayne, N.J.

[73] Assignee: ISP Investments Inc., Wilmington, Del.

[21] Appl. No.: 661,954

[22] Filed: Feb. 28, 1991

Related U.S. Application Data

[60] Division of Ser. No. 564,936, Aug. 9, 1990, Pat. No. 5,026,810, which is a continuation-in-part of Ser. No. 481,037, Feb. 16, 1990, Pat. No. 4,980,430, and a continuation-in-part of Ser. No. 424,453, Oct. 20, 1989, abandoned.

[51] Int. Cl.$^5$ ............................................. B32B 33/00
[52] U.S. Cl. ................................. 428/204; 8/DIG. 1; 427/387; 428/260; 428/266; 428/288; 428/290; 428/334; 428/335; 428/336; 428/378; 428/391; 428/429; 428/447; 428/450; 428/452; 428/473
[58] Field of Search ............... 428/204, 260, 266, 288, 428/290, 334, 335, 336, 378, 391, 429, 447, 450, 452, 473; 8/DIG. 1; 427/387

Primary Examiner—James C. Cannon
Attorney, Agent, or Firm—Marilyn J. Maue; Joshua J. Ward

[57] ABSTRACT

This invention relates to vinyl ether siloxanes having the formula

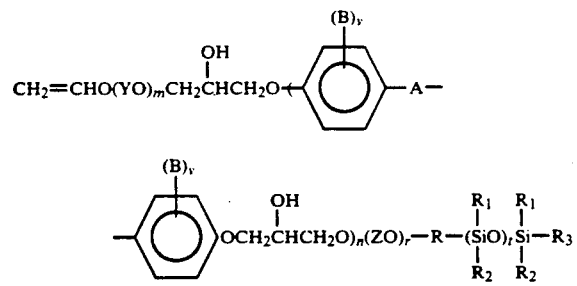

wherein
Y is alkylene or phenylene optionally substituted with fluorine,
R is alkylene or alkylene phenylene,
$R_1$ and $R_2$ are lower alkyl,
$R_3$ is $C_1$ to $C_{20}$ alkyl,
A is $-CH_2-$, $>C(CH_3)_2$, or

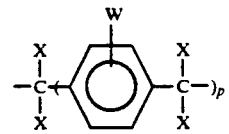

W is

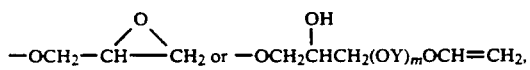

with the proviso W is

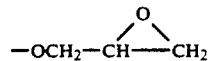

when p is one and at least one of W is

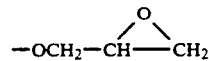

when p is greater than one;
Z is $C_2$ to $C_3$ alkylene,
X is hydrogen or methyl,
B is halo or lower alkyl,
m has a value of from 1 to 10,
n has a value of from 1 to 20,
p has a value of from 0 to 10,
r has a value of from 0 to 20,
t has a value of from 1 to 100 and
v has a value of from 0 to 4.

The invention also relates to the process of preparing the present vinyl ether siloxanes and to their use as coating materials.

8 Claims, No Drawings

VINYL ETHER SILOXANES AS PROTECTIVE COATINGS AND SOIL-RELEASE SURFACINGS

This application is a division of U.S. application Ser. No. 564,936, filed Aug. 9, 1990 and now U.S. Pat. No. 5,026,810 which is a continuation-in-part of U.S. application Ser. No. 481,037, filed Feb. 16, 1990 and now U.S. Pat. No. 4,980,430 and a continuation-in-part of U.S. application Ser. No. 424,453, filed Oct. 20, 1989 and now abandoned.

In one aspect the invention relates to vinyl ether siloxanes having multifunctionality. In another aspect the invention relates to the use of said siloxanes as durable, chemically resistant soil release and anti-soil deposition coatings.

BACKGROUND OF THE INVENTION

Good soil release and anti-soil deposition coatings are in great demand, however, many of the commercially available products do not possess high resistance to chemical attack and do not provide a hard surface coating. Also, some of the commercial coating products are limited to porous substrates and are not useful as coatings on metals, glass, etc. Accordingly, it is desirable to provide a coating material having good adhesion to non-porous surfaces, as well as high resistance to chemical attack.

It is an object of the present invention to provide a compound or a formulation containing the compound which is capable of imparting high chemical resistance, good adhesion, and superior soil release and anti-soil deposition properties to the surface of porous and non-porous substrates.

Still another object is to provide a commercially feasible and economical process for the preparation of the present compounds.

Yet another object is the process of using compositions incorporating a vinyl ether siloxane as a soil release, anti-soil deposition agent.

These and other objects of this invention will become apparent from the following description and disclosure.

THE INVENTION

In accordance with this invention there is provided novel vinyl ether siloxane compounds having the formula

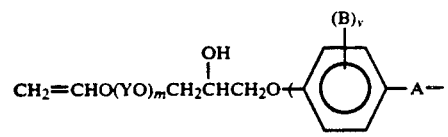

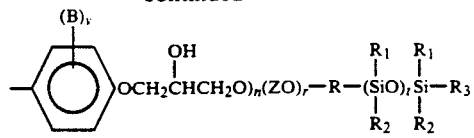

wherein
Y is alkylene or phenylene optionally substituted with fluorine,
R is alkylene or alkylene phenylene,
$R_1$ and $R_2$ are lower alkyl,
$R_3$ is $C_1$ to $C_{20}$ alkyl,
A is $-CH_2-$, $>C(CH_3)_2$, or

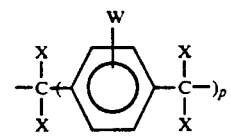

W is

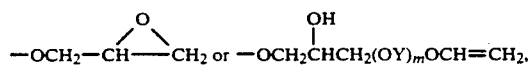

with the proviso W is

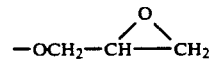

when p is one and at least one of W is

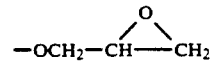

when p is greater than one;
Z is $C_2$ to $C_3$ alkylene,
X is hydrogen or methyl,
B is halo or lower alkyl,
m has a value of from 1 to 10,
n has a value of from 1 to 20,
p has a value of from 0 to 10,
r has a value of from 0 to 20,
t has a value of from 1 to 100 and
v has a value of from 0 to 4.

The preferred siloxanes of this invention are those wherein
Y is $-(CH_2)_{2-6}-$ or
R is $C_2$ to $C_4$ alkylene,
n has a value of from 1 to 10, t has a value of from 1 to 50 and $R_1$ and $R_2$ are methyl.

Some specific examples of the present siloxanes include

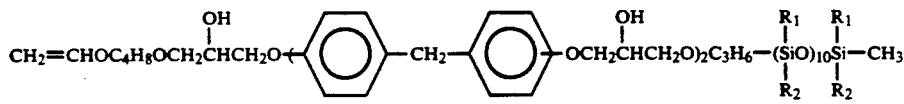

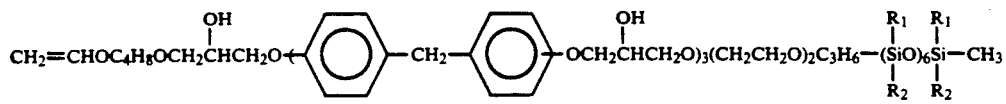

-continued

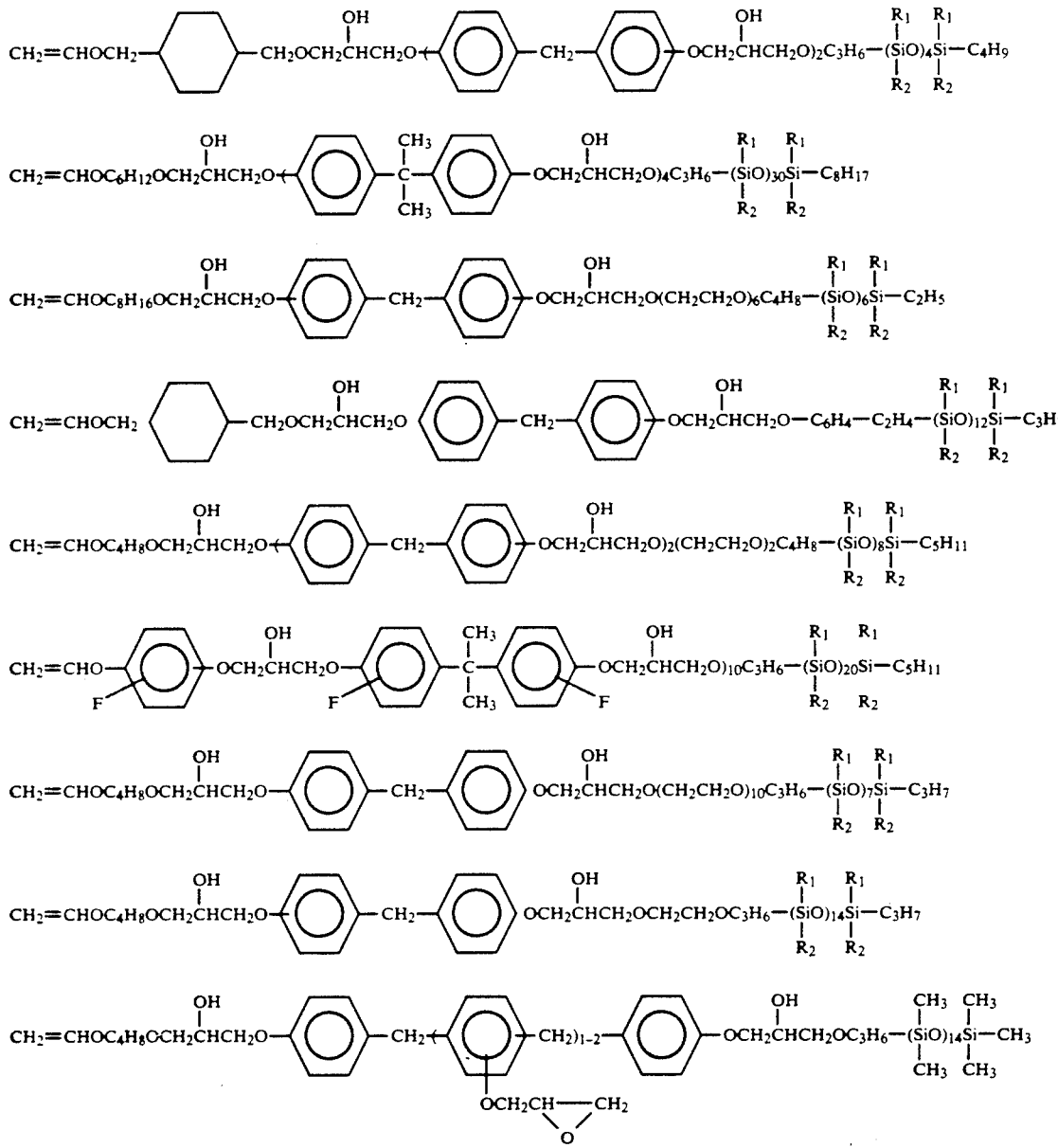

The present siloxanes can be synthesized by reacting a hydroxy terminated siloxane and an epoxy vinyl ether coreactant, such as a product of copending U.S. patent application Ser. No. 481,037 when p has a value of one and Y is epoxy. This reaction is illustrated by equation I.

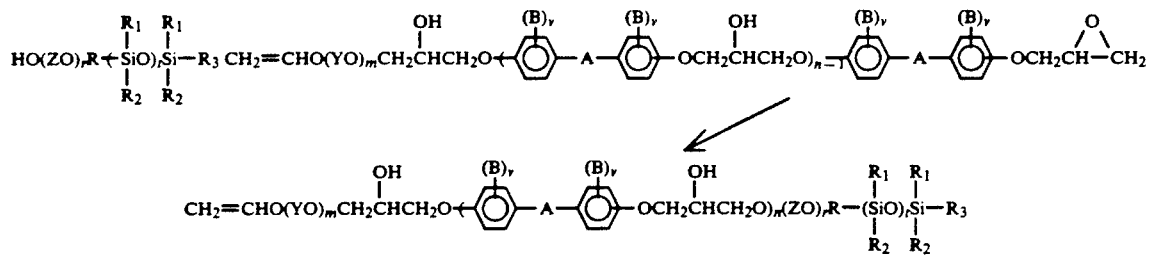

Alternatively, the present siloxane can be prepared by the reaction between a hydroxyvinyl ether and an epoxy siloxane, as in equation II.

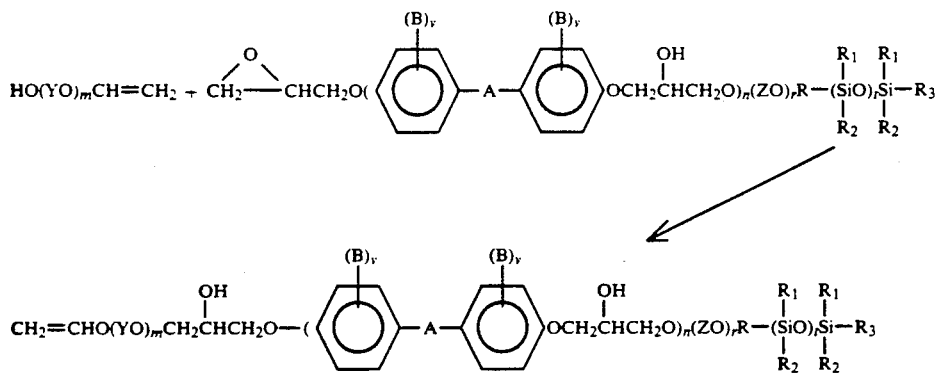

where, in equations I and II, Z, R, $R_1$, $R_2$, $R_3$, Y, A, B, r, t, m, n and v are as described above.

The above synthesis can be carried out under anhydrous conditions at a temperature of between about 100° and about 180° C. under atmospheric pressure for a period of from about 1 to about 200 hours, although preferred operating conditions include a temperature of between about 120° and about 160° C. for a period of from about 4 to about 100 hours. The reactants are contacted in stoichiometric amount, i.e. a ratio of about 1:1 hydroxy to epoxy groups, although a slight excess of the hydroxylated reactant can be employed.

The reaction is effected in the presence of a basic catalyst such as an alkali metal catalyst of sodium, potassium or lithium metal, hydrides or hydroxides. The preferred catalysts are hydroxides of the above metals. The catalyst comprises between about 0.05 and about 5 weight %, preferably between about 0.1 and about 1 weight % of the reaction mixture.

The reaction can be carried out in the presence or in the absence of an inert solvent; however, the use of a solvent, up to 80% dilution of the reactant mixture, is recommended where the reactants are highly viscous. Suitable inert solvents are those having a boiling point of at least 100° C. and include xylene, toluene, 2-methoxyethyl ether, tripropylene glycol dimethyl ether, tri- and tetra-ethylene glycol dimethyl ether, N-methyl pyrrolidone and the like.

The product is recovered from the reactor and can be directly applied to a substrate such as a metal, glass, leather, plastic, ceramic, wood, fabric, or fiber surface in a thickness of from about 0.05 to about 5 mils to provide a chemically resistant, stain resistant, soil release and anti-soil deposition coating. These coatings are particularly useful when applied to the fibers of a carpet or as a coating over painted metal surfaces, e.g. automotive bodies. Also, the coatings can be buffed to a high luster when applied to furniture or painted surfaces Photographic films can be coated for protection against abrasion and chemical attack. These and many other uses will become apparent from this disclosure.

When desired, the present siloxane product can be treated with absorbant magnesium silicate, or an equivalent absorbant, to remove small amounts of metal catalysts. In such cases, the ratio of magnesium silicate to catalyst used is between about 50:1 and about 150:1. The absorbant treated product can then be filtered to separate trace amounts of catalyst.

The coating operation using these vinyl ether siloxanes is carried out under standard methods employing conventional equipment. Since the products of this invention are often highly viscous or waxy solids, they may be dissolved in a suitable inert solvent or in a commercial coating formulation to provide the desired spreading consistency. Any of the above mentioned solvents, as well as N-vinyl pyrrolidone, vinyl ether, diluents such as divinyl ethers of 1,4-butanediol, and 1,4-cyclohexanedimethanol, cyclohexyl vinyl ether, 2-ethyl hexylvinyl ether, tri- or tetra- ethylene glycol, 1,6-hexanediol and lower boiling solvents such as acetone, methyl ethyl ether, cyclohexane and the like can be employed for this purpose.

Having thus described the invention, reference is now had to the following examples which illustrate preferred embodiments but which are not to be construed as limiting to the scope of the invention as more broadly set forth above and in the appended claims.

EXAMPLE 1

Trimethylsiloxy-hydroxyethoxypropyl polydimethylsiloxane (47.1 g., 0.038 moles) from Petrarch Systems, epoxy resin Epon DPL-862 (13.0 g., 0.038 moles) from Shell Chemical Co., o-xylene (100 g.) and potassium hydroxide (0.07 g.) were charged into a 300 ml flask equipped with a mechanical stirrer, a thermometer, a nitrogen inlet and a condenser adapted with a drying tube. The mixture was heated at 120° C. under a stream of nitrogen for 2 hours to remove the water generated. 4-Hydroxybutyl vinyl ether (4.4 g., 0.038 moles) was added and the mixture was held at 120° C. for a total 24 hours and then at reflux for 48 hours under a nitrogen blanket. The solvent was stripped off under a reduced pressure and a gel-like product comprising

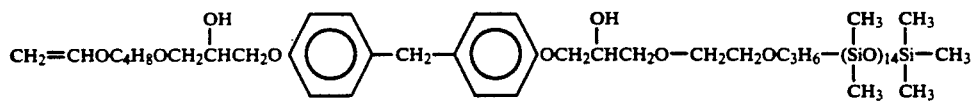

was obtained.

EXAMPLE 2

Trimethylsiloxy-hydroxyethoxypropyl polydimethylsiloxane (136.1 g., 0.1 mole), epoxy resin Epon 828 (37.7 g., 0.1 mole) from Shell Chemical Co., monovinyl ether of triethylene glycol (17.6 g., 0.1 mole), o-xylene (180 ml) and potassium hydroxide (0.2 g.) are charged into a 500 ml flask equipped with a mechanical stirrer, a thermometer, a nitrogen inlet and a condenser adapted with a drying tube. The mixture is heated at 120° C. under a stream of nitrogen for 24 hours and then held at 150° C. for 24 hours under a nitrogen blanket. The solvent is stripped off under reduced pressure and a gel-like product comprising

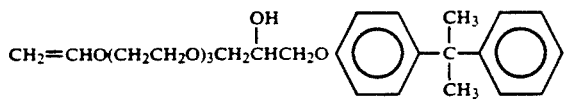

is obtained.

EXAMPLE 3

Trimethylsiloxy-hydroxyethoxypropyl polydimethylsiloxane (62.5 g., 0.05 moles) from Petrarch Systems, epoxy resin DEN 438 (28.5 g., 0.05 moles) from Dow Chemical Co., o-xylene (100 g.) and potassium hydroxide (0.1 g.) were charged into a 300 ml flask equipped with a mechanical stirrer, a thermometer, a nitrogen inlet and a condenser adapted with a drying tube. The mixture was heated at 120° C. under a stream of nitrogen for 2 hours to remove the water generated. 4-Hydroxybutyl vinyl ether (5.8 g., 0.05 moles) was added and the mixture was held at 120° C. for a total 24 hours and then at reflux for 48 hours under a nitrogen blanket. The solvent was stripped off under a reduced pressure and a gel-like product comprising

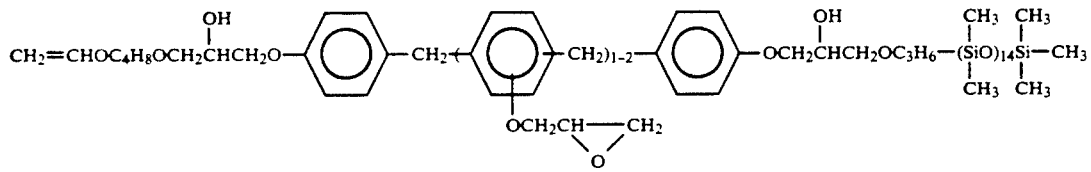

was obtained.

It is to be understood that other siloxanes and vinyl ether epoxylated compounds within the defined scope of this invention can be substituted in the above examples to provide the corresponding vinyl ether siloxane products.

What is claimed is:

1. A substrate coated with a layer of a composition containing an inert carrier and an effective protecting amount of the vinyl ether siloxane having the formula

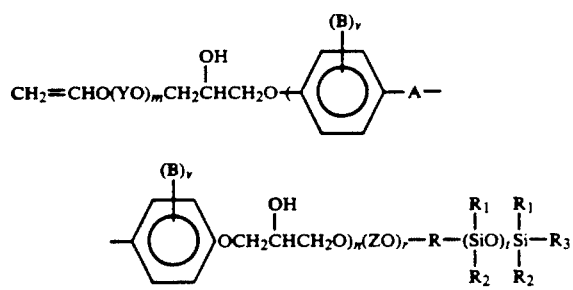

wherein

Y is alkylene or phenylene optionally substituted with fluorine,

R is alkylene or alkylene phenylene, $R_1$ and $R_2$ are lower alkyl, $R_3$ is $C_1$ to $C_{20}$ alkyl, A is $-CH_2-$, $>C(CH_3)_2$, or

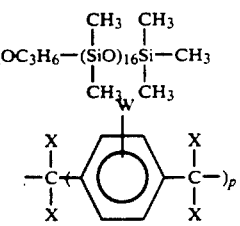

W is

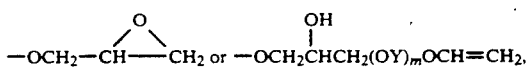

with the proviso W is

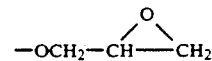

when p is one and at least one of W is

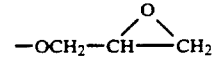

when p is greater than one;

Z is $C_2$ to $C_3$ alkylene,

X is hydrogen or methyl,

B is halo or lower alkyl, m has a value of from 1 to 10, n has a value of from 1 to 20, p has a value of from 0 to 10, r has a value of from 0 to 20, t has a value of from 1 to 100 and v has a value of from 0 to 4 to provide a chemically resistant soil releasing surface layer thereon.

2. The substrate of claim 1 wherein the coated layer is in a thickness of between about 0.03 and about 5 mils.

3. The substrate of claim 1 wherein said vinyl ether siloxane is a compound where R is $C_2$ to $C_4$ alkylene; $R_1$ and $R_2$ are each methyl; Y is linear alkylene or $-CH_2C_6H_{10}CH_2-$; n has a value of from 1 to 10 and t has a value of from 1 to 50.

4. The substrate of claim 1 wherein said vinyl ether siloxane has the formula

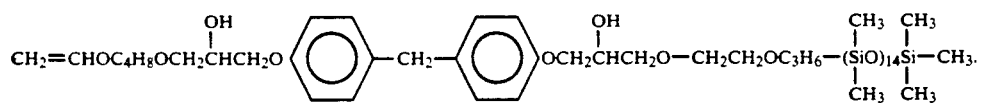
5. The substrate of claim 1 wherein said vinyl ether siloxane has the formula
7. The substrate of claim 1 wherein said vinyl ether siloxane has the formula
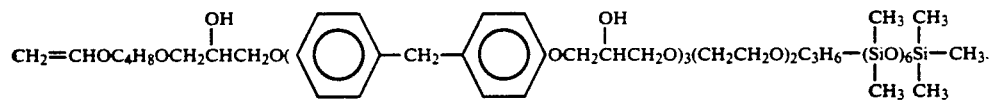
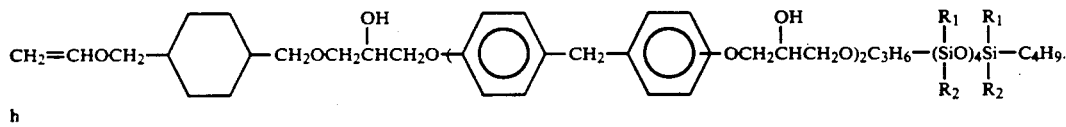
h
6. The substrate of claim 1 wherein said vinyl ether siloxane has the formula
8. The substrate of claim 1 wherein said vinyl ether siloxane has the formula
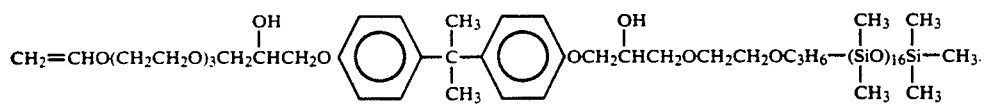
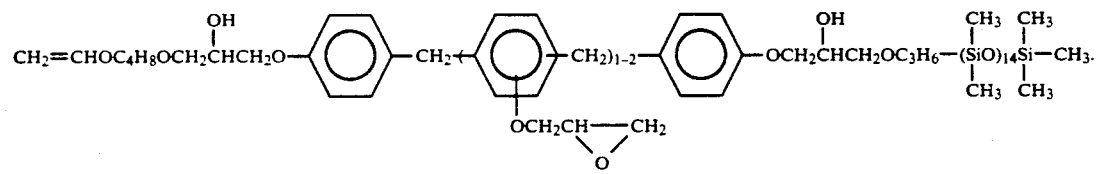
* * * * *